(12) United States Patent
Masson et al.

(10) Patent No.: US 8,780,794 B2
(45) Date of Patent: Jul. 15, 2014

(54) METHOD FOR ADVERTISING IN IP MULTIMEDIA SUBSYSTEM AND SERVER AND TERMINAL THEREOF

(75) Inventors: Romain Masson, Paris (FR); Olivier Cadene, Mont Morency (FR)

(73) Assignee: LG Electronics Inc., Seoul (KR)

( * ) Notice: Subject to any disclaimer, the term of this patent is extended or adjusted under 35 U.S.C. 154(b) by 1227 days.

(21) Appl. No.: 12/307,615

(22) PCT Filed: Apr. 26, 2007

(86) PCT No.: PCT/KR2007/002060
§ 371 (c)(1),
(2), (4) Date: Feb. 2, 2010

(87) PCT Pub. No.: WO2008/004753
PCT Pub. Date: Jan. 10, 2008

(65) Prior Publication Data
US 2010/0128666 A1 May 27, 2010

Related U.S. Application Data

(60) Provisional application No. 60/819,010, filed on Jul. 7, 2006.

(51) Int. Cl.
*H04W 4/00* (2009.01)

(52) U.S. Cl.
USPC ........... 370/328; 370/329; 370/330; 370/338; 370/339; 370/337; 455/517; 455/219; 455/225; 455/551; 455/560

(58) Field of Classification Search
USPC .......... 455/517, 219, 225, 551, 560; 370/338, 370/337, 339, 328, 329, 330
See application file for complete search history.

(56) References Cited

U.S. PATENT DOCUMENTS

| | | | |
|---|---|---|---|
| 6,937,699 B1 * | 8/2005 | Schuster et al. | 379/67.1 |
| 2004/0059820 A1 * | 3/2004 | Holden et al. | 709/227 |
| 2005/0041578 A1 | 2/2005 | Huotari et al. | |
| 2006/0026629 A1 | 2/2006 | Harris et al. | |
| 2008/0235083 A2 * | 9/2008 | Bosarge et al. | 705/14 |
| 2009/0235299 A1 * | 9/2009 | Astrom et al. | 725/25 |

* cited by examiner

*Primary Examiner* — Brandon Renner
*Assistant Examiner* — Abdelnabi Musa
(74) *Attorney, Agent, or Firm* — Birch, Stewart, Kolasch & Birch, LLP

(57) ABSTRACT

Disclosure may be to allow a Service Provider (or operator) to intercept SIP messages (e.g., SIP INVITE method, or SIP MESSAGE method) in the path of the IMS signaling link and insert advertising information therein, thereby delivering the advertising information inserted in the SIP messages to one or more end users (i.e., originating end or terminating end, or all of them).

22 Claims, 6 Drawing Sheets

Ad Info : Advertising information

Ad Info : Advertising information ical Application No. 60/819,
METHOD FOR ADVERTISING IN IP MULTIMEDIA SUBSYSTEM AND SERVER AND TERMINAL THEREOF

CROSS-REFERENCE TO RELATED APPLICATIONS

This application is the National Phase of PCT/KR2007/002060 filed on Apr. 26, 2007, which claims priority under 35 U.S.C. 119(e) to U.S. Provisional Application No. 60/819,010 filed on Jul. 7, 2006, which is hereby expressly incorporated by reference into the present application.

BACKGROUND OF THE INVENTION

1. Field of the Invention

The disclosure relates to a session based service, and more particularly, to a method, a server and a terminal for providing adverting service within IP Multimedia Subsystem (IMS) in any SIP (Session Initiation Protocol) based service.

2. Discussion of the Related Art

In general, SIP denotes a signaling protocol which defines a procedure in which terminals desiring to communicate with each other identify and find their locations, and establish or release (or change) multimedia service sessions therebetween. Services based on SIP (i.e., SIP based services) have a request/response structure of controlling generation, modification and termination of multimedia service sessions. Also, the SIP based services provide services by using a SIP Uniform Resource Locator (URL), which is similar to an email address, without regard to IP (Internet Protocol) addresses so as to enable identification of each user.

Internet Protocol (IP) Multimedia Subsystems (IMS) refers to a core network technology related to 'A11 IP' which integrates (unifies) wired and wireless communication environments. The IMS was introduced by the Third Generation Partnership Project (3GPP) which develops global specifications of a wireless communication. The IMS adapts an infrastructure for providing IP multimedia service.

An IMS based service aims to compositively provide multimedia data such as voices, audio, video, data and the like based upon the IP protocol, and to construct an infrastructure in which services can rapidly be developed and varied.

An introduction of an A11 IP based network through the IMS is mainly directed to receiving abundant contents and new service capabilities which are provided on top of a packet switch into an integrated network.

A logical structure of the A11 IP network is roughly classified into three layers: a radio network domain, a GPRS based packet switched service domain and an IP multimedia service domain. Explanations will be given for each construction of the A11 IP network as follows.

First, the radio network domain is constituted with a mobile terminal which refers to a service user, a node B managing a connection of the mobile terminal via a wireless interval, and a node such as a Radio Network Controller (RNC) and the like, The GPRS based packet service domain is constituted with a serving GPRS support node (SGSN) and a gateway GPRS support node (GGSN) for managing a user packet data delivery between a wireless access network domain and an external network or an Instant Message (IM) service domain, managing a mobility of the mobile terminal and providing a PDP content activation service.

In addition, the IMS defines an architecture that enables the use of the SIP/SDP protocol provided by the IETF, thus allowing the management of sessions. That is, the IMS can support an end-to-end multimedia service based upon the SIP.

SUMMARY OF THE INVENTION

This disclosure is to provide new technical ideas that advertisement is introduced (or embedded or inserted) into SIP signaling (e.g., SIP messages) in IMS and the SIP signaling with the advertisement may reach to end users for better versatile services.

Therefore, this disclosure is to provide a method for advertising in IP Multimedia Subsystem (IMS), the method comprising: receiving, by a first entity, a first message toward a target terminal, the first message originated by a source terminal; sending, by the first entity, the first message to a second entity; receiving, by the first entity, from the second entity the first message including first advertising information inserted by the second entity; and sending, by the first entity, to the target terminal the first message having the first advertising information.

Preferably, the step of the sending the first message to a first entity includes: checking whether a user of the target terminal has requested an advertising service by analyzing the user's subscription information (e.g., so called a user profile); inserting route header fields in the first message.

Preferably, the method further comprising: receiving, by the first entity, from the target terminal a second message in response of the first message; sending, by the first entity, the second message to the second entity; receiving, by the first entity, from the second entity the second message including second advertising information inserted by the second entity; and sending, by the first entity, to the source terminal the second message having the second advertising information.

This disclosure is also to provide a method for advertising in IP Multimedia Subsystem (IMS), the method comprising: sending, by the application server, a session initiating message toward one or more terminating terminal in order to establish a first session, the session initiating message sent from one or more originating terminal; establishing, by an application server, a second session in order to sending advertising information; and sending, by the application server, the advertising information through the established second session to either or both of the originating terminals and the terminating terminals.

Preferably, the second session is independent to the first session, and is established after completing the first session.

Preferably, each of the first and the second session is a session based on SIP, and the application server is configured in a originating Home Network or a terminating Home Network.

Preferably, the advertising information is localized or customized information for each user of the originating terminals or the terminating terminals.

In this disclosure, a method for advertising in IP Multimedia Subsystem (IMS), the method comprising: intercepting a message based on SIP; inserting advertising information in the message; and sending the message including the advertising information to one or more target terminals.

Preferably, the advertising information is inserted in the message by an application server dedicated to advertising or a CPM (Converged IP Message).

Preferably, the message including the advertising information is sent, by the application server or the CPM, to the one or more target terminals via one or more Call Session Control Units (CSCFs).

In this disclosure, a terminal in IP Multimedia Subsystem (IMS), comprising: receiver for receiving a message with advertising information sent by a application server; processor for processing the received message to thus render the advertising information; and output unit for outputting the processed advertising information.

Preferably, the terminal further may comprise memory for storing the advertising information from the received message for later use.

Preferably, the output unit may include at least one of a displayer displaying image or video and a device emitting a sound.

In this disclosure, an application server for advertising in IP Multimedia Subsystem (IMS), the server comprising: receiver for receiving a message based on SIP from a entity (e.g., one or more Call Session Control Units); controller for inserting advertising information in the message; and transmitter for sending the message including the advertising information to one or more target terminals via the entity.

In this disclosure, A system for advertising in IP Multimedia Subsystem (IMS), the system comprising: an application server for sending a commanding message to forward advertisement to one or more target terminals; and a managing server (e.g., CPM) for creating advertising information, inserting it in the message, sending the inserted message.

Preferably, the commanding message may include at least one of following: an address of the target terminals; specific advertising information in format of text, audio, image or video; link information; and link to buy a product (e.g., web address).

BRIEF DESCRIPTION OF THE DRAWINGS

FIG. 2 is an exemplary SIP MESSAGE to be forwarded by Ad AS;

FIG. 5 is an exemplary INVITE message to be forwarded by Ad AS;

DESCRIPTION OF THE EMBODIMENTS

Figure 1:
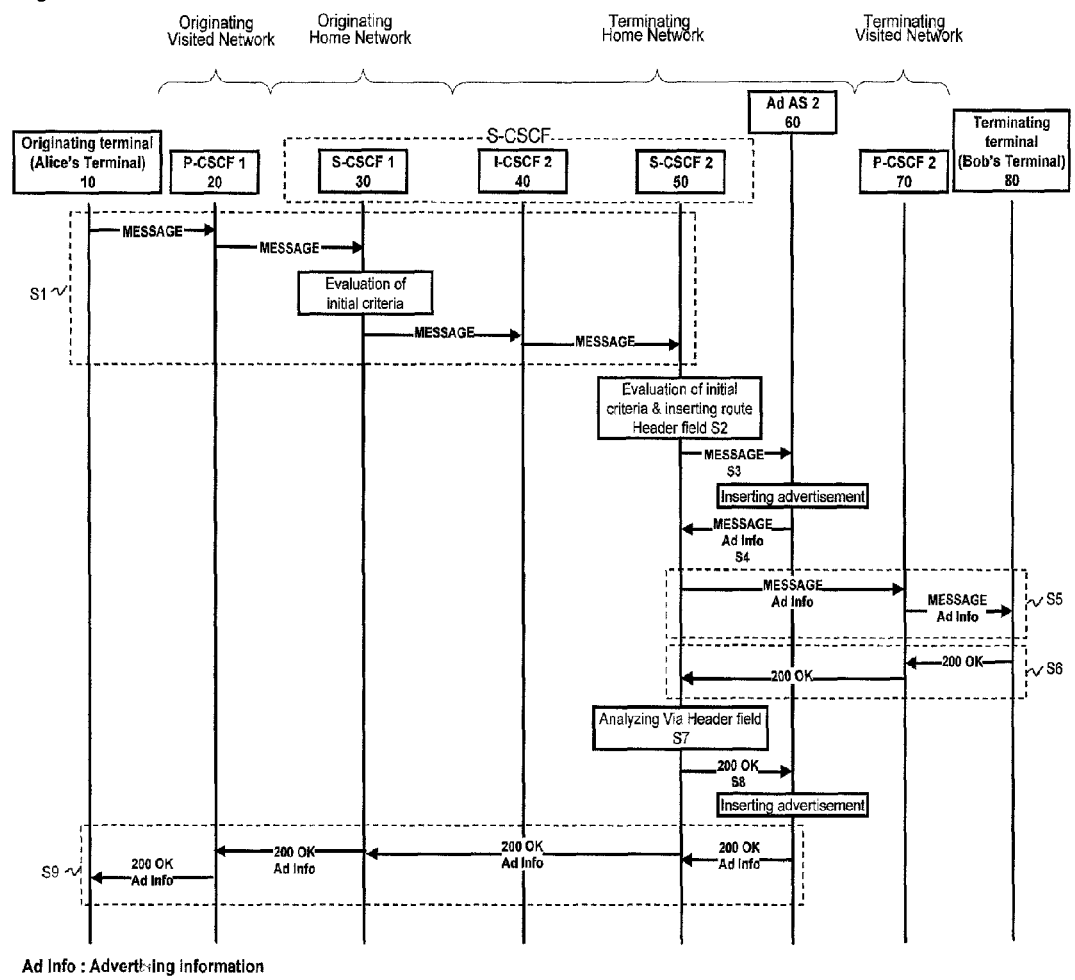
FIG. 1 is a view illustrating elements of this disclosure and a signal flow among the elements in accordance with a first embodiment of this disclosure.

This disclosure may be applied to wired/wireless communications systems related to IMS based on Session Initiation Protocol (SIP). However, this disclosure may not be limited thereto, but be applicable to any type of systems and devices to adapt the fundamental ideas of this disclosure.

This disclosure basically relates to providing information on advertisement with end points which can be end users or SIP servers depending on previously predetermined information (e.g., user profile stored in HSS). The fundamental concept of this disclosure is, firstly to allow a Service Provider (or operator) to intercept SIP messages (e.g., SIP INVITE method, or SIP MESSAGE method) in the path of the IMS signaling link and insert advertising information therein, thereby delivering the advertising information inserted in the SIP messages to end users (i.e., originating end or terminating end, or both of them) who have already requested (registered) to receiving an advertising service.

Meanwhile, the information inserted in SIP message may be, for example, commercial advertisement provided by a Service Provider, sports news, current news, insecurity information, weather forecasting service and so on. Also, the information may be subscribers customized information such as local news, local weather forecasting service, shopping information and the like. It is assumed that the information is commercial advertisement for the sake of a brief explanation of this disclosure. The information may be inserted in Body or Header of SIP message, type of which may be for example:

(1) text, audio, image or video;
(2) Link information (e.g., URI); or
(3) Link to buy a product (e.g., web address).

The information may be converted to advertising messages (e.g., text, or video, or image) and the advertising messages may display on a display unit of end user's terminal.

The basic concept of this disclosure may be implemented by first through sixth embodiments hereafter. More particularly, the embodiments of this disclosure may be classified according to the type of SIP message and according to whether Ad AS is configured in a originating leg or terminating leg. The embodiments of this disclosure may be classified into first thru fifth embodiments according to the type of SIP message which contains advertising information. The first to second embodiments may be a case where SIP message is dedicated to advertisement and also generated by the Service Provider (Operator) to directly send advertisement information to the end users. The first embodiment may be illustrated in FIGS. 1 and 3. The third to forth embodiments may be a case where SIP message is not dedicated to advertisement but a kind of conventional SIP message commonly known to persons skilled in a related art, for example, SIP INVITE method which is used to initiate a SIP session between the end users' terminals through SIP core network. The second embodiment may be illustrated in FIGS. 4 and 6. And the fifth embodiment may be a case where a specific session (so called 'media flow') can be established in parallel to a chat or call session. That is, the third embodiment may be a case where SIP INVITE method including advertising information in Body thereof is provided with the end users who attending a call or chat session. The fifth embodiment may be illustrated in FIG. 7. In addition, the sixth embodiment will be illustrated in FIG. 8 in which a server (so called CPM enabler) can manage (e.g., send, insert, forward, etc.) various operations related to advertisements.

Furthermore, a terminal and a server (Ad AS) used for explaining the embodiments according to this disclosure will first be described hereafter.

A terminal denotes a mobile communication terminal which inclusively includes devices such as mobile phones, cellular phones, or user equipment (UEs). Also, the terminal may include every wire or wireless device capable of using the IMS service based on SIP.

Ad AS (Advertisement Application Server) is dedicated to performing operations and functions with respect to advertising. Ad AS may be configured (constructed) in an originating home network, a terminating home network or both of them. It may insert advertising information (one or more advertising messages) into Body or Header of an exemplary SIP message. Generally, SIP message is structured to have Header and Body. For example, advertising information may be kinds of advertising message such as Text, Images, Video, Graphics, etc, a link to advertising messages (URI) or a link to buy a product. Ad AS may intercept SIP messages (e.g., SIP INVITE, 200 OK, SIP MESSAGE, etc.) in the path of IMS signaling link, insert advertising information in the intercepted SIP messages and thereby forward it back to at least one of end users' terminals. In addition, while performing a chat or call session between end users, Ad AS may provide end users' terminals with advertising information which inserted in SIP INVITE method. Here, the SIP INVITE method is not intercepted in the path of IMS signaling link between end users, but generated by Ad AS for advertising. As a result, the advertising information (messages) generated by Ad AS may be rendered at an originating terminal, at a terminating terminal or both of them Hereinafter, configurations and operations in the preferred embodiments of this disclosure will be described with reference to the accompanying drawings.

FIG. 1 just illustrates main elements for explaining a technical concept of this disclosure, namely, an originating terminal 10 (Alice's terminal), P-CSCF1 2O (Proxy Call Session Control Function), S-CSCF1 30 (Serving Call Session Control Function), I-CSCF2 40 (Interrogating Call Session Control Function), S-CSCF2 50, Ad AS2 60 (Advertisement Application Server), P-CSCF2 70 and terminating terminal 80 (Bob's terminal), and other network elements may be omitted for a brief explanation. Therefore, a detailed procedure for setting up a session among the main components (e.g., call session controlling units such as P-CSCF, I-CSCF and S-CSCF) of the IMS network can be understood by those skilled in the technical field of this disclosure, to thus be omitted for a brief explanation of this disclosure.

FIG. 1 is a view illustrating elements (components, or entities) of this disclosure and a signal flow among the elements in accordance with a first embodiment of this disclosure. FIG. 1 may illustrate a scenario where Alice (who having subscription to an Originating Home Network) is performing a call to Bob (who having subscription to a Terminating Home Network).

Therefore, S-CSCF1 30 is configured in an originating home network to which Alice has subscription, but other elements except for S-CSCF1 30 in FIG. 1 are configured in a visited network. The other elements refer to P-CSCF1 20, S-CSCF1 30, I-CSCF2 40, S-CSCF2 50, Ad AS2 60 and P-CSCF2 70. Alternatively, Ad AS2 60 may be configured in a terminating home network. It is assumed that both originating terminal (Alice's terminal) and terminating terminal (Bob's terminal) have already completed registration process for IMS. It is also assumed that both the originator (Alice) and the recipient (Bob) have decided to receive advertising service from Ad AS2 60, in-formation of which included in each user's profile (i.e., originator's user profile and recipient's user profile). Here, user's profile may be generally stored, for example at HSS (Home Subscription Server) (not shown).

FIG. 1 illustrates a case where an originating terminal 10 and a terminating terminal 80 are subscribed to different network, that is, an originating terminal 10 subscribed to originating Home Network and a terminating terminal 80 to terminating Home Network. In FIG. 1, Ad AS is configured in terminating Home Network.

As illustrated in FIG. 1, an originating terminal 10 (i.e., Alice' terminal), located in visited network, may send SIP MESSAGE having Alice' message (e.g., 'Hey Bob, how are you doing?' in FIG. 2) to a terminating terminal 80 (i.e., Bob) via P-CSCF1 2O, S-CSCF1 30 of originating Home Network, I-CSCF2 40 and S-CSCF2 50 of terminating Home Network (S1).

When S-CSCF2 50 of terminating Home Network receives SIP MESSAGE, it may evaluate filter criteria by checking the recipient's user profile which stored at HSS (not shown) (S2). In the step of S2, S-CSCF2 50 may determine whether the SIP MESSAGE has to traverse Ad AS2 60. S-CSCF2 50 may learn that the terminating terminal 80 has already requested the advertising service by analyzing (checking) the user profile of the recipient (Bob). S-CSCF2 50 then may insert in the SIP MESSAGE Route header fields (e.g., 'Via SIP/2.0/UDP Adas2@home2.net' in FIG. 2) that points to the Ad AS2 60 in the first place and the S-CSCF2 50 in the second place (e.g., 'Via SIP/2.0/UDP scscf2@home2.net' in FIG. 2) as exemplary SIP MESSAGE shown in FIG. 2. This is done to ensure that the Ad AS 60 forwards the SIP MESSAGE back to the same S-CSCF2 50.

Figure 2:
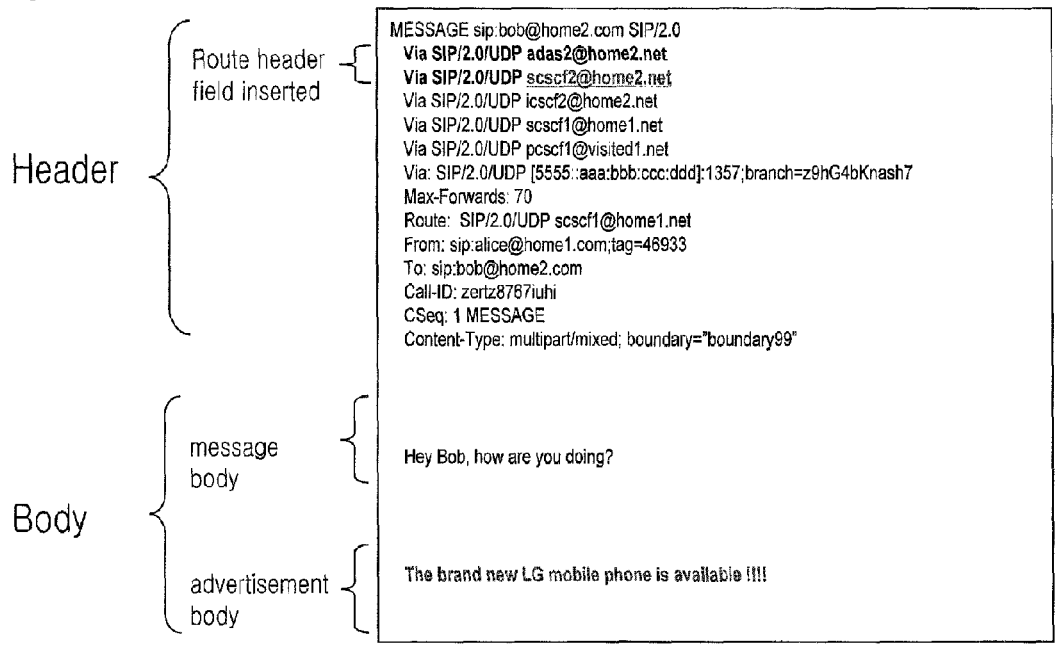

S-CSCF2 50 may forward the SIP MESSAGE including Route header fields to Ad AS2 60 (S3). Ad AS2 60 may receive (intercept) the SIP MESSAGE with Route header fields, add an advertising information (or advertisement body) (e.g., "The brand new LG mobile phone is available !!!!" in FIG. 2) as shown in FIG. 2 and send it back to the S-CSCF2 50 (S4). Here, the advertising information may contain one or several files, or a link (URL), and may be text, image, video, audio, etc. in format.

After receiving the SIP MESSAGE including advertising information, S-CSCF2 50 may forward it to the terminating terminal 80 via P-CSCF2 70 (S5).

When the terminating terminal 80 receives the SIP MESSAGE, Bob may check Alice's message together with advertisement message inserted in the SIP MESSAGE. At this point, several possibilities may exist:

Bob may have to watch the advertisement before reading the message from Alice;

Bob may have to store the advertisement for further consumption. For example, Bob may have to watch a certain number of advertisements to have the ability to send a free message;

The advertisement message may be displayed as part of Alice's message.

In response of the SIP MESSAGE from the originating terminal 10, the terminating terminal 80 may send a response message (e.g., 200 OK) to S-CSCF2 50 of terminating Home Network via P-CSCF2 70 of terminating Visited Home Network (S6).

On receiving the 200 OK, S-CSCF2 50 may analyze Via header field of 200 OK which is the same as route header field inserted at the step of S2 (S7). Since the SIP address of the Ad AS2 60 (i.e., 'Via SIP/2.0/UDP adas2@home2.net') is present in the Via header field, S-CSCF2 50 may forward the 200 OK to Ad AS2 60 (S8).

Ad AS2 60 may receive the 200 OK from S-CSCF2 50 and insert advertising information (advertisement message or advertisement body) in the 200 OK toward the originating terminal 10. Here, the advertising information may be the same as or different from the one sent to Bob.

Ad AS2 60 may forward (send) the 200 OK including the advertising information to S-CSCF2 50. S-CSCF2 50 then may forward it to the originating terminal 10 via S-CSCF1 30 of originating Home Network and P-CSCF1 20 of originating Visited Network.

Eventually, the advertisement inserted in the 200 OK may be displayed onto Alice's terminal 10. As for Bob's advertisement, Alice may have to watch her advertisement. The content (e.g., text, image, video, audio, etc.) of the advertisement may be stored on the terminal (device) for later use. The terminal may render the advertisement with the native application of the terminal depending on the advertisement format (e.g., a text is displayed as an SMS message, the video is rendered by the video player, etc.).

It may be mandatory that the originator (Alice) or the recipient (Bob) or both should consume the content (i.e., advertisement) before being authorized to send (retrieve) the pager mode message (i.e., message through SIP MESSAGE method).

Alternatively, in a case where both an originator (or originating terminal) and a recipient (or terminating terminal) may have subscription to the same Home Network (e.g., IMS), network elements configured between an originator (Alice) and recipient (Bob) may include P-CSCF1 20, S-CSCF, Ad AS2 60 and P-CSCF2 70. In this case, all the network elements may be configured in the same SIP Core Home Network. Therefore, SIP MESSAGE sent from Alice's terminal may be forwarded to Bob's terminal via P-CSCF1 20, S-CSCF, Ad AS2 60 and P-CSCF2 70.

Figure 3:
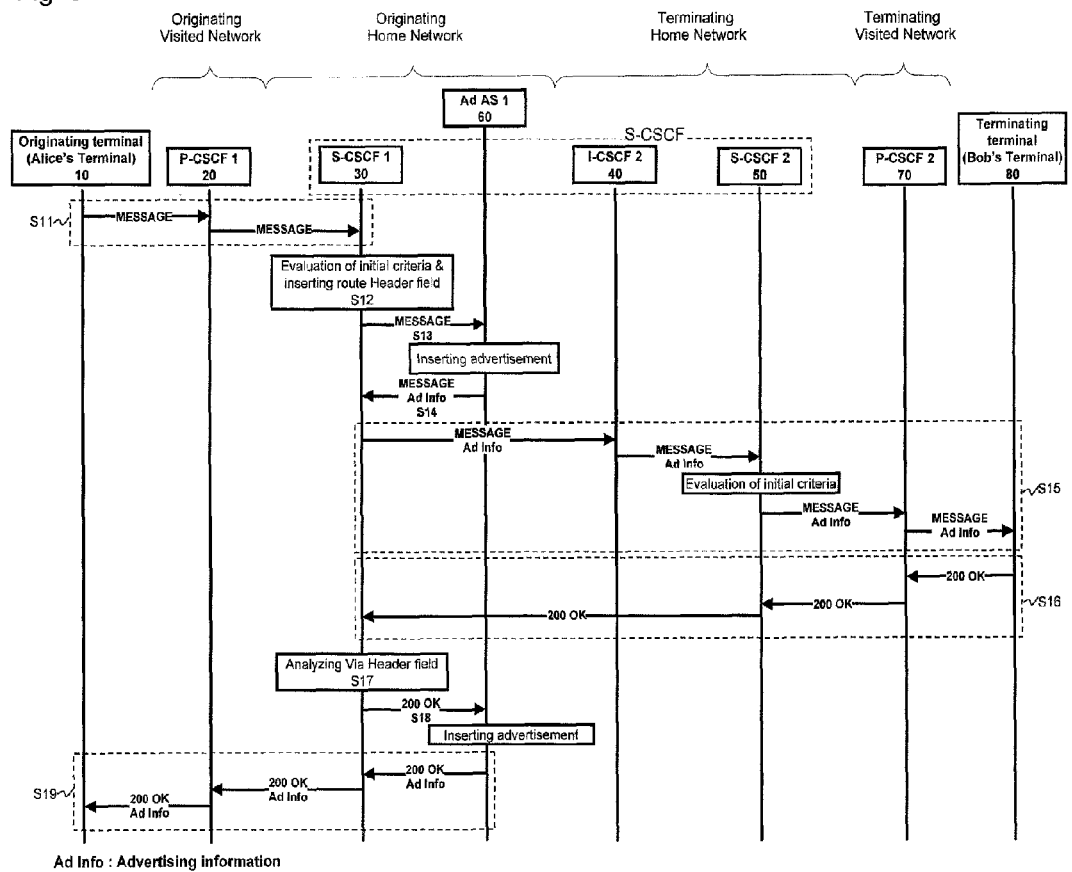
FIG. 3 is a view illustrating elements of this disclosure and a signal flow among the elements in accordance with a second embodiment of this disclosure.

FIG. 3 is a view illustrating components of this disclosure and a signal flow among the elements (components, or entities) in accordance with a second embodiment of this disclosure. In comparison with the first embodiment shown in FIG. 1, there is just only difference in such point that Ad AS is configured at originating Home Network instead of at terminating Home network and also S-CSCF1 of FIG. 3 performs the same functions and operation with respect to adding advertisement as those of S-CSCF2 of FIG. 1. That is, Ad AS is configured at Home Network to which an originator has subscription. Ad AS1 of FIG. 3 may be the same as Ad AS2 of FIG. 1 in view of functions and operations. Further, the elements illustrated in FIG. 3 are the same as those in FIG. 1. Therefore, a reference numeral, a function and an operation of each component may be the same as those of each element in FIG. 1. Hereinafter, the second embodiment will be explained briefly.

As illustrated in FIG. 3, an originating terminal 10 (i.e., Alice' terminal), located in visited network, may send SIP MESSAGE having Alice' message (e.g., 'Hey Bob, how are you doing?' in FIG. 2) to a terminating terminal 80 (i.e., Bob) via P-CSCF1 2O and S-CSCF1 30 (S11).

When S-CSCF1 30 of originating Home Network receives SIP MESSAGE, it may evaluate filter criteria of the recipient (Bob) by checking the user profile which stored at HSS (not shown) (S12). In the step of S12, S-CSCF1 30 may determine whether the SIP MESSAGE has to traverse Ad AS1 60. S-CSCF1 30 may be learned that the terminating terminal 80 has already requested the advertising service by analyzing (checking) the user profile of the recipient (Bob). S-CSCF1 30 then may insert in the SIP MESSAGE Route header fields (e.g., 'Via SIP/2.0/UDP adas1@home2.net') that points to the Ad AS1 60 in the first place and the S-CSCF1 30 in the second place (e.g., 'Via SIP/2.0/UDP scscf1@home2.net'). This is done to ensure that the Ad AS1 60 forwards the SIP MESSAGE back to the same S-CSCF1 30.

S-CSCF1 30 may forward the SIP MESSAGE including Route header fields to Ad AS1 60 (S13). Ad AS1 60 may receive (intercept) the SIP MESSAGE with Route header fields, add advertising information (or advertising information) (e.g., "The brand new LG mobile phone is available!!!!" in FIG. 2) and send it back to the S-CSCF1 30 (S14). Here, the advertising information may contain one or several files, or a link (URL), and may be text, image, video, audio, etc. in format.

After receiving the SIP MESSAGE including advertising information, S-CSCF1 30 may forward it to the terminating terminal 80 via terminating one or more network elements such as I-CSCF2 40, S-CSCF2 50 and P-CSCF2 70 (S15).

When the terminating terminal 80 receives the SIP MESSAGE, Bob may check Alice's message together with advertisement message inserted in the SIP MESSAGE.

In response of the SIP MESSAGE from the originating terminal 10, the terminating terminal 80 may send a response message (e.g., 200 OK) which routed (sent) via P-CSCF2 70, S-CSCF2 50 and S-CSCF1 30 (S16).

On receiving the 200 OK, S-CSCF1 30 may analyze Via header field of 200 OK which is the same as route header field inserted at the step of S12 (S17). Since the SIP address of the Ad AS1 60 of the originating Home Network (i.e., 'Via SIP/2.0/UDP adas1@home2.net') is present in the Via header field, S-CSCF1 30 may forward the 200 OK to Ad AS1 60 (S18).

Ad AS1 60 may receive the 200 OK from S-CSCF1 30 and insert advertising information (advertisement message or advertisement body) in the 200 OK toward the originating terminal 10. Here, the advertising information may be the same as or different from the one sent to Bob.

Ad AS1 60 may forward (send) the 200 OK including the advertising information to S-CSCF1 30. S-CSCF1 30 then may forward it to the originating terminal 10 via P-CSCF1 20.

Eventually, the advertisement inserted in the 200 OK may be displayed onto Alice's terminal 10. As for Bob's advertisement, Alice may watch her advertisement. The content (e.g., text, image, video, audio, etc.) of the advertisement may be stored on the terminal (device) for later use. The terminal may render the advertisement with the native application of the terminal depending on the advertisement format (e.g., a text is displayed as an SMS message, the video is rendered by the video player, etc.).

It may be mandatory that the originator (Alice) or the recipient (Bob) or both should consume the content (i.e., advertisement) before being authorized to send (retrieve) the pager mode message (i.e., message through SIP MESSAGE method).

Figure 4:
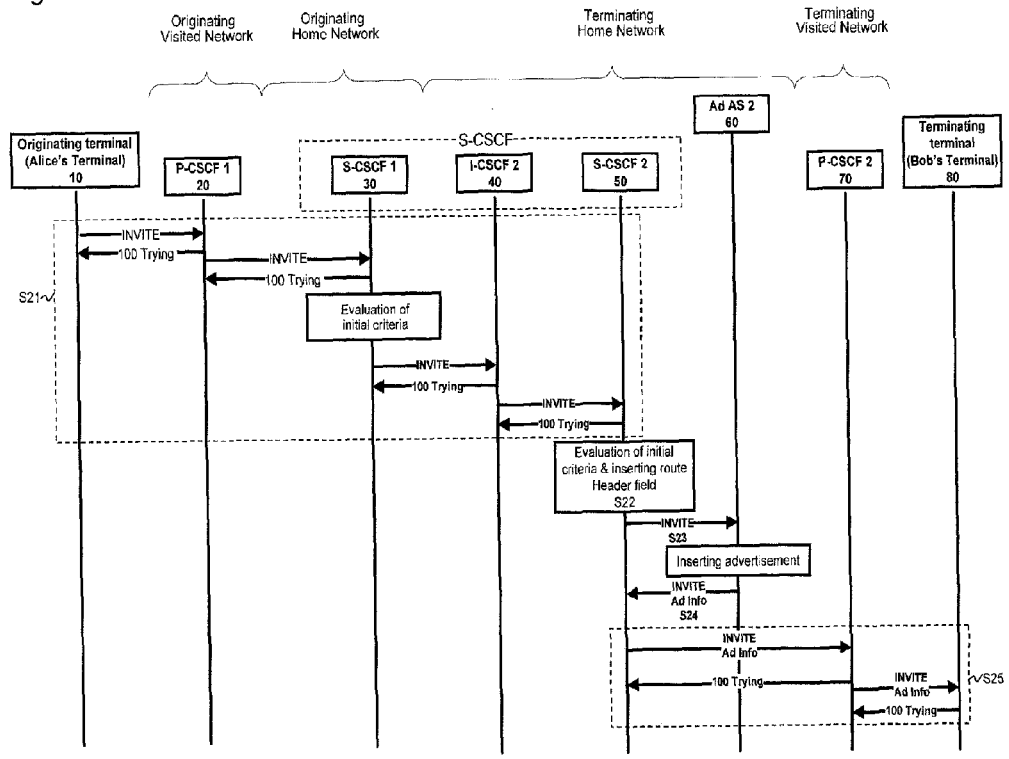
FIG. 4 is a view illustrating elements of this disclosure and a signal flow among the elements in accordance with a third embodiment of this disclosure.

FIG. 4 is a view illustrating elements (components, or entities) of this disclosure and a signal flow among the elements in accordance with a third embodiment of this disclosure. FIG. 4 may illustrate an exemplary scenario where Alice (who having subscription to an Originating Home Network) is inviting Bob (who having subscription to a Terminating Home Network) for a chat by using SIP INVITE method (so called INVITE message). In the third embodiment of FIG. 4, S-CSCF1 30 is configured in an originating home network to which Alice has subscription, but other elements except for S-CSCF1 30 are configured in a terminating home network. The other elements may refer to P-CSCF1 2O, S-CSCF1 30, I-CSCF2 40, S-CSCF2 50, Ad AS2 60 and P-CSCF2 70. Alternatively, Ad AS2 60 may be configured in an originating home network. It is assumed that both originating terminal (Alice's terminal) and terminating terminal (Bob's terminal) have already completed registration process for IMS. It is also assumed that the recipient (Bob) have decided to receive advertising service from Ad AS2 60, information of which included in each user's profile (i.e., recipient's user profile). Here, user's profile may be generally stored, for example at HSS (Home Subscription Server) (not shown).

FIG. 4 illustrates a case where an originating terminal 10 and a terminating terminal 80 are subscribed to a different network, that is, an originating terminal 10 subscribed to an originating Home Network and a terminating terminal 80 to a terminating Home Network. In FIG. 4, Ad AS is configured in a terminating Home Network.

Figure 5:
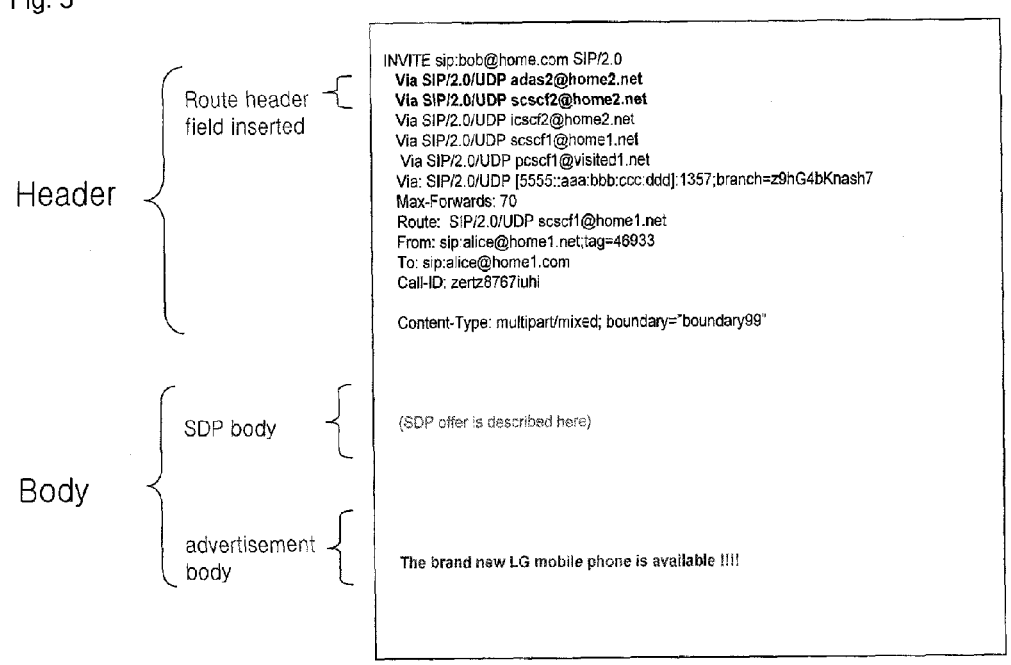

As illustrated in FIG. 4, in order to invite Bob (recipient) for a chat, Alice may try to send SIP INVITE method (i.e., INVITE message) to Bob. The INVITE message as shown in FIG. 5 may be forwarded from Alice's terminal 10 (i.e., originating terminal) to S-CSCF2 50 via P-CSCF1 20, S-CSCF1 30, I-CSCF2 40 (S21).

When S-CSCF2 50 of a terminating Home Network receives The INVITE message to invite Bob for a chat, it may evaluate filter criteria of the recipient (Bob) by checking the user profile which stored at HSS (not shown) (S22). In the step of S22, S-CSCF2 50 may determine whether the INVITE message has to traverse Ad AS2 60. S-CSCF2 50 may be learned that the terminating terminal 80 (or Bob) has already requested the advertising service by analyzing (checking) the user profile of the recipient (Bob). S-CSCF2 50 then may insert in the INVITE message the Route header fields (e.g., 'Via SIP/2.0/UDP adas2@home2.net' in FIG. 5) that points to the Ad AS2 60 in the first place and the S-CSCF2 50 in the second place (e.g., 'Via SIP/2.0/UDP scscf2@home2.net'). This is done to ensure that the Ad AS2 60 forwards the INVITE message back to the same S-CSCF2 50.

S-CSCF2 50 may forward the INVITE message including Route header fields to Ad AS2 60 (S23). Ad AS2 60 may receive (intercept) INVITE message with Route header fields, add (insert) an advertising information (or advertisement body) (e.g., "The brand new LG mobile phone is available !!!!" in FIG. 5) in addition with a SDP (Session Description Protocol) body as shown in FIG. 5 and send it back to the S-CSCF2 50 (S24). Here, the advertising information may contain one or several files, or a link (URL), and may be text, image, video, audio, etc. in format. FIG. 5 may illustrate an exemplary INVITE message to be forwarded by Ad AS2 60.

After receiving the INVITE message including advertising information, S-CSCF2 50 may forward it to the terminating terminal 80 via P-CSCF2 70 (S25).

The terminating terminal 80 may receive the INVITE message and then try to initiate the session with respect to inviting a chat from Alice. At this time, the advertisement message (i.e., "The brand new LG mobile phone is available !!!!") from the INVITE message may be displayed onto Bob's terminal 80. The content (e.g., text, image, video, audio, etc.) of the advertisement may be stored on the terminal (device) for later use. The terminating terminal 80 may render the advertisement with the native application of the terminal depending on the advertisement format (e.g., a text is displayed as an SMS message, the video is rendered by the video player, etc.).

It may be mandatory that the originator (Alice) or the recipient (Bob) or both should consume the content (i.e., advertisement) before being authorized to initiate the session for the chat invited by the originator.

Meanwhile, if the terminal is aware of a size limit of SIP messages (e.g., INVITE message), it may split the messages in several SIP messages of the session setup (e.g., a content may be spited in 3 and sent over INVITE, PRACK, UPDATE messages to the recipient).

Alternatively, in a case where both an originator (or originating terminal) and a recipient (or terminating terminal) may have subscription to the same Home Network (e.g., IMS), network elements configured between an originator (Alice) and a recipient (Bob) may include P-CSCF1 20, S-CSCF, Ad AS2 60 and P-CSCF2 70. In this case, all the network elements may be configured in the same SIP Core Home Network. Therefore, the INVITE message sent from Alice's terminal may be forwarded to Bob's terminal via P-CSCF1 20, S-CSCF, Ad AS2 60 and P-CSCF2 70.

Figure 6:
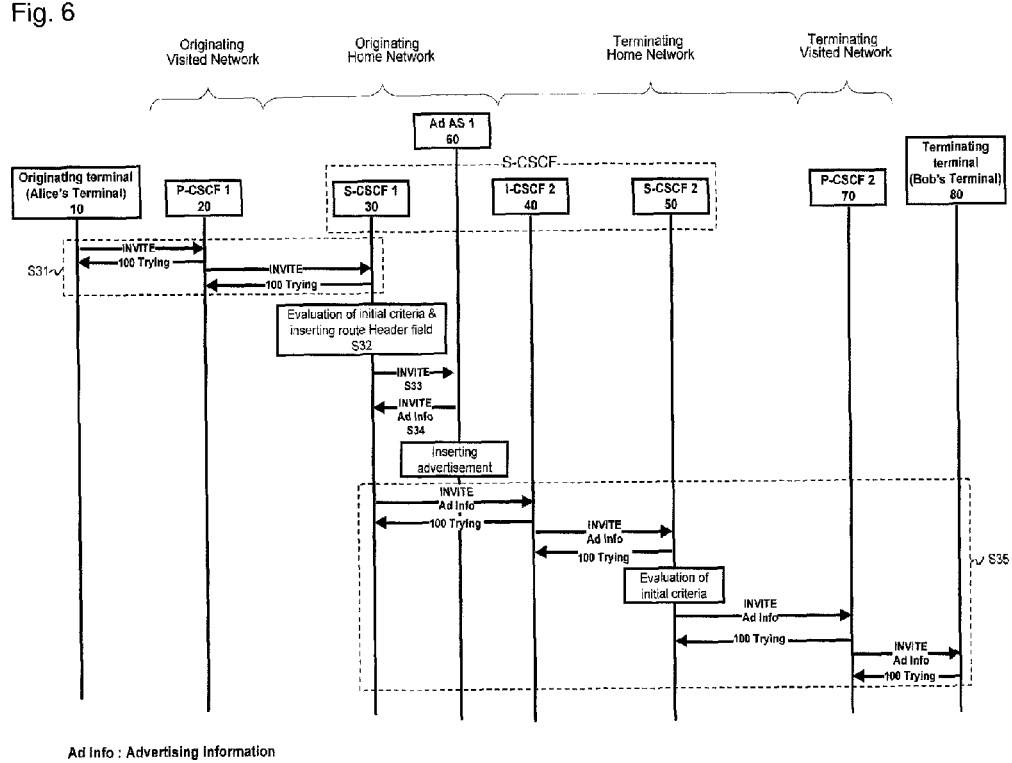
FIG. 6 is a view illustrating elements of this disclosure and a signal flow among the elements in accordance with a forth embodiment of this disclosure.

FIG. 6 is a view illustrating elements (components, or entities) of this disclosure and a signal flow among the elements in accordance with a fourth embodiment of this disclosure. In comparison with the third embodiment shown in FIG. 1, there is just only difference in such point that Ad AS is configured at an originating Home Network instead of at a terminating Home network and also S-CSCF1 of FIG. 6 performs the same functions and operation with respect to adding (inserting) advertisement as those of S-CSCF2 of FIG. 4. That is, Ad AS is configured at a Home Network to which an originator has subscription. Ad AS 1 of FIG. 6 may be the same as Ad AS2 of FIG. 4 in view of functions and operations. Further, the elements illustrated in FIG. 6 are the same as those in FIG. 4. Therefore, a reference numeral, a function and an operation of each component may be the same as those of each element in FIG. 4. Hereinafter, difference in the fourth embodiment against the third embodiment will be briefly explained.

As illustrated in FIG. 6, in order to invite Bob (recipient) for a chat, Alice may try to send SIP INVITE method (i.e., INVITE message) to Bob. The INVITE message may be forwarded from Alice's terminal 10 (i.e., originating terminal) to S-CSCF1 30 via P-CSCF1 20 (S31).

When S-CSCF1 30 of a terminating Home Network receives The INVITE message to invite Bob for a chat, it may evaluate filter criteria of the recipient (Bob) by checking the user profile which stored at HSS (not shown) (S32). In the step of S32, S-CSCF1 30 may determine whether the INVITE message has to traverse Ad AS1 60. S-CSCF1 30 may be learned that the terminating terminal 80 (or Bob) has already requested the advertising service by analyzing (checking) the user profile of the recipient (Bob). S-CSCF1 30 then may insert in the INVITE message the Route header fields (e.g., 'Via SIP/2.0/UDP adas1@home2.net') that points to the Ad AS1 60 in the first place and the S-CSCF1 30 in the second place (e.g., 'Via SIP/2.0/UDP scscf1@home2.net'). This is done to ensure that the Ad AS1 60 forwards the INVITE message back to the same S-CSCF1 30.

S-CSCF1 30 may forward the INVITE message including Route header fields to Ad AS1 60 (S33). Ad AS1 60 may receive (intercept) INVITE message with Route header fields, add (insert) an advertising information (or advertisement body) (e.g., "The brand new LG mobile phone is available !!!!") in addition with a SDP body as shown in FIG. 5 and send it back to the S-CSCF2 50 (S24). Here, the advertising information may contain one or several files, or a link (URL), and may be text, image, video, audio, etc. in format.

After receiving the INVITE message including advertising information, S-CSCF1 30 may forward it to the terminating terminal 80 via I-CSCF2 40, S-CSCF2 50 and P-CSCF2 70 (S35).

The terminating terminal 80 may receive the INVITE message and then try to initiate the session with respect to inviting a chat from Alice. At this time, the advertisement message (i.e., "The brand new LG mobile phone is available !!!!") from the INVITE message may be displayed onto Bob's terminal 80. The content (e.g., text, image, video, audio, etc.) of the advertisement may be stored on the terminal (device) for later use.

Figure 7:
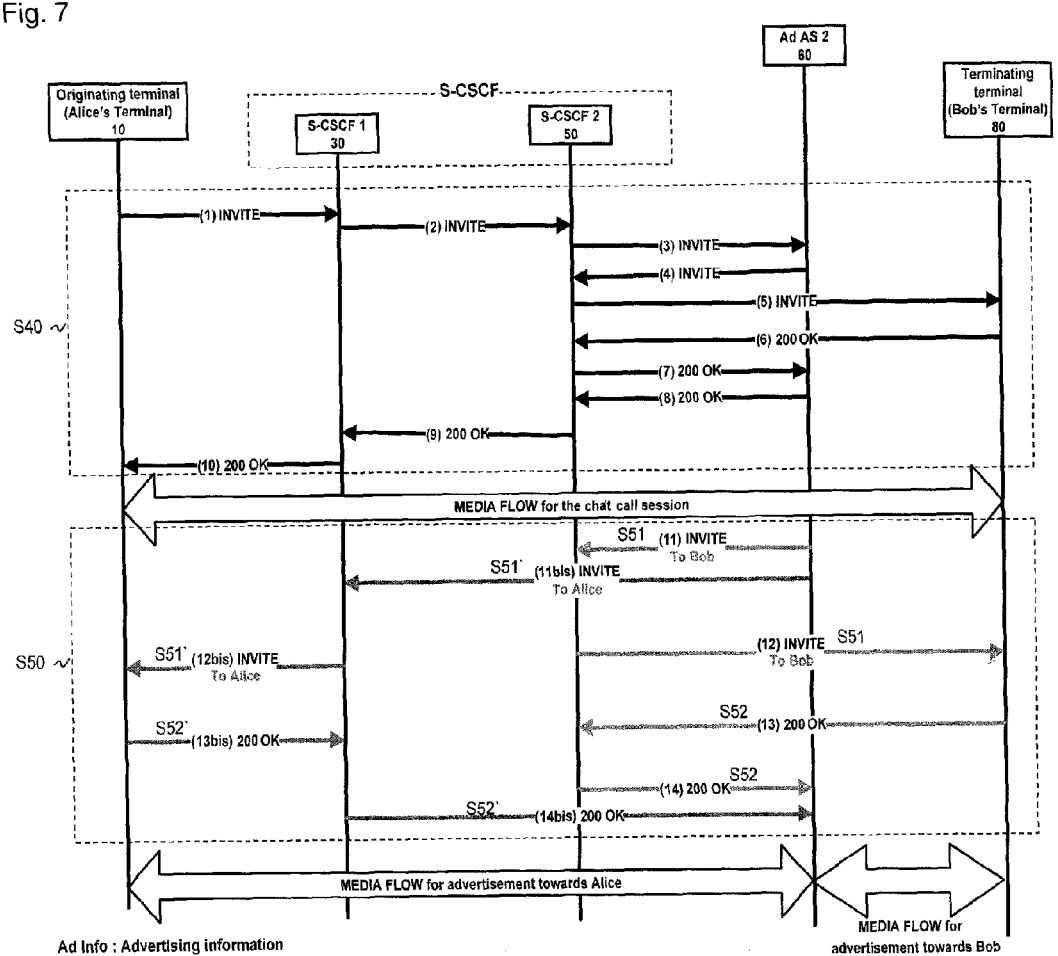
FIG. 7 is a view illustrating elements and a signal flow among the elements in accordance with a fifth embodiment of this disclosure.

FIG. 7 is a view illustrating elements (components, or entities) and a signal flow among the elements in accordance with a fifth embodiment of this disclosure. The fifth embodiment of FIG. 7 may illustrate an exemplary scenario where Application Server establishes a parallel media stream to transmit advertisement information (or messages) during a chat or a call session. This embodiment may allow Ad AS to establish a media flow between the Ad AS and one or more end users (or all of end users) in parallel to their SIP session dedicated to their chat or call. In this case, the Ad AS may not modify the chat or the call session. The Ad AS, however, may be allowed to establish one new SIP session per end user in order to transmit the advertisement flow. That is, the new SIP session per end user may allow the Ad AS to provide (send) a streaming of advertisement messages (information) to the end user on a chat or call session, but independent to the chat or call session. FIG. 7 may illustrate an exemplary situation where both end users (i.e., Alice and Bob) receive an advertising stream in parallel to their chat or call. For simplicity of explanation, the session setup procedure may be only displayed as INVITE and 200 OK messages. It is assumed in FIG. 7 that Alice (or Alice's terminal) and Bob (Bob's terminal) have subscription to different home networks each other. However, if both Alice and Bob have subscription to the same home network, S-CSCF in FIG. 7 may be replaced for S-CSCF1 30 and S-CSCF2 50.

As illustrated in FIG. 7, after completing a SIP session for a chat or call session between Alice's terminal 10 and Bob's terminal 80 (S40), another SIP session may be performed by Ad AS2 60 in order to send an advertising stream (S50). Ad AS2 60 may establish one new SIP session per a user (Alice and Bob) that will receive the advertisement flow in order to send a media stream. Ad AS2 60 may send INVITE message to one or more end users (all of end users) (e.g., Alice and Bob in FIG. 7) to initiate a new SIP session for media flow in parallel to the chat or call session. In case where Ad AS2 60 provides advertisement stream to all of end users (e.g., Alice and Bob), Ad AS2 60 may forward one INVITE message to Alice's terminal 10 via S-CSCF1 30, and another INVITE message to Bob's terminal 80 via S-CSCF2 50 respectively (S51 and S51').

In response of the INVITE message, each terminal (i.e., Alice's terminal and Bob's terminal) may send a response message (e.g., 200 OK) to Ad AS2 60 via its SIP Core (i.e., S-CSCF1 for Alice's terminal and S-CSCF2 for Bob's terminal) (S52 and S52').

As such, through the steps of S51~S52 and S51'~S52', respective media flow may be set up be between Ad AS2 60 and each terminal, and thereby each terminal may receive an advertising stream from Ad AS2 60. Here, a content of the advertising stream for each terminal may be the same or totally different. In addition, the content of the advertising stream may be customized or local oriented for each user's preference and taste.

Figure 8:
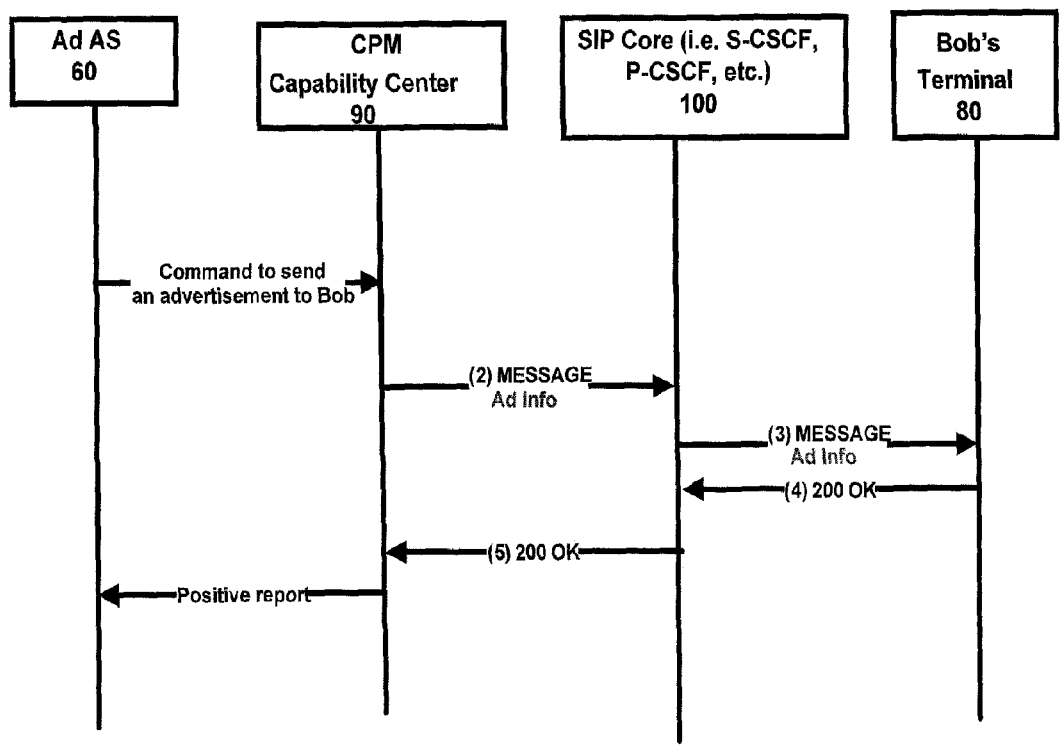
FIG. 8 is a view illustrating elements and a signal flow among the elements in accordance with a sixth embodiment of this disclosure.

FIG. 8 is a view illustrating elements (components, or entities) and a signal flow among the elements in accordance with a sixth embodiment of this disclosure. The sixth embodiment of FIG. 8 may illustrate a exemplary scenario where the CPM (Converged IP Messaging) enabler is configured to interface with Ad AS 60. The CPM enabler may be configured to integrate a management related to advertisements. For example, it may send or insert advertisements.

As illustrated in FIG. 8, Ad AS 60 may command CPM 90 to send one or more advertising information (or advertising stream) to Bob's terminal 80. Here, a commanding message may include at least one of the following:

(1) each address (URI, URL, etc.) of one or more target terminals (e.g., Bob's terminal);

(2) specific advertising information in format of text, audio, image or video;

(3) Link information (e.g., URI); and (4) Link to buy a product (e.g., web address).

CPM 90 may receive the commanding message from Ad AS 60 and insert (add) one or more advertising information in any SIP messages (e.g., SIP MESSAGE method) to thus send the target terminal (i.e., Bob's terminal 80) via SIP Core 100. CPM 90 may receive a response message (e.g., 200 OK) from the target terminal and then inform (report) Ad AS 60 of successfully performing Ad AS 60's command (indicated as "Positive report" in FIG. 8).

In view of Ad AS 60, it may be effective for CPM 90 to reduce a traffic load because CPM 90 can create advertisement information (or messages) and send it to one or more target terminals on behalf of Ad AS 60, which results in enhancing of Ad AS 60's efficiency.

As described above, this disclosure may provide a scheme to carry advertising information or links to advertising information by using any SIP messages used for signaling purpose by request message (e.g., SIP MESSAGE, SIP INVITE, etc.) and response message (e.g., 200 OK) involved in a IMS session.

Furthermore, in this disclosure, a dedicated Application Server (Ad AS) may be to insert advertisements in any SIP messages, generate SIP MESSAGE containing advertisements or initiate a SIP session to transmit large advertisement content through MSRP channel.

Besides, in this disclosure, a parallel media flow may be established which dedicated to advertising in addition to a call/chat session.

In addition, in this disclosure, customized or localized information may be provided with one or more end users by inserting relevant advertisement (for example, "there is a book store close to you where you can have special prices, go there and get a special price thanks to your IMS operator").

Furthermore, in this disclosure, Ad AS may interlocked (interwork or connected) with one or more entities (e.g., Location server such as VLR (Visitor Location Register)) which can provide information on each terminal's location (or a specified terminal group's locations). Ad AS may provide one or more terminals (end users) with advertising information which is localized and customized based on the end users' location (area, or zone), by receiving (obtaining, or retrieving) the end users' location information from the one or more entities.

Hereinafter, a terminal, an Ad Application Server and a system will be explained briefly based on embodiments of this disclosure aforementioned with reference to FIGS. 1 thru 8.

According to this disclosure, a terminal may include a hardware and software constructions needed to receive the advertising service (or information) in IMS. The terminal may comprise at least one of components as follows: (1) receiver for receiving a message with advertising information sent by an application server; (2) processor for processing the received message to thus render the advertising information; and (3) output unit for outputting the processed advertising information. The terminal further may comprise memory for storing the advertising information from the received message for later use. Here, the output unit may include at least one of a displayer displaying image or video and a device emitting a sound. As described above, operations and functions of each component of the terminal which just includes the technical features of this disclosure have been described. However, it is obvious to those skilled in the art that other known components of the terminal may be needed to receive IMS services, explanation of which will be omitted.

According to this disclosure, an application server for advertising in IP Multimedia Subsystem (IMS) may comprise: (1) receiver for receiving a message based on SIP from a entity (e.g., one or more Call Session Control Units); (2) controller for inserting advertising information in the message; and (3) transmitter for sending the message including the advertising information to one or more target terminals via the entity.

In this disclosure, A system for advertising in IP Multimedia Subsystem (IMS) may comprise: (1) an application server for sending a commanding message to forward advertisement to one or more target terminals; and (2) a managing server (CPM) for creating advertising information, inserting it in the message, sending the inserted message. Here, the commanding message may include at least one of the following: (1) an address of the target terminals; (2) specific advertising information in format of text, audio, image or video; (3) link information; and (4) link to buy a product (e.g., web address).

The methods described so far can be implemented by software, hardware or their combination. For example, the method for advertising in IP Multimedia Subsystem (IMS) can be a program that can be stored in a storage medium (e.g., an internal memory of a mobile terminal or an application server, a flash memory, a hard disk, etc.). The program stored in the storage medium can be executed by a processor (e.g., an internal microprocessor of the mobile terminal or the application server).

As described above, this disclosure has been explained with reference to the embodiments which are merely exemplary. It will be apparent to those skilled in the art that various modifications and variations can be made in this disclosure. Thus, it is intended that this disclosure cover modifications and variations of this invention provided they come within the scope of the appended claims and their equivalents.

The invention claimed is:

1. A method for advertising in an IP Multimedia Subsystem (IMS), the method comprising:
   receiving, by a first entity, a first message toward a target terminal, the first message originated by a source terminal, wherein the first message has contents for a first session between the source terminal and the target terminal;
   sending, by the first entity, the first message to a second entity, wherein the first message is intercepted in a path of the IMS signaling link by the second entity;
   receiving, by the first entity, from the second entity the first message including first advertising information, wherein the first advertising information is inserted into the intercepted first message by the second entity; and
   sending, by the first entity, to the target terminal the first message having the first advertising information,
   wherein, during the first session, a second session is established between the second entity and the source terminal by exchanging a third message transmitted from the second entity to the source terminal and a fourth message transmitted from the source terminal to the second entity in response to the third message, and a third session is established between the second entity and the target terminal by exchanging the third message transmitted from the second entity to the target terminal and the fourth message transmitted from the target terminal to the second entity in response to the third message, and wherein second advertising information is transmitted from the second entity to the source terminal via the second session, and third advertising information is transmitted from the second entity to the target terminal via the third session.

2. The method of claim 1, wherein the step of the sending the first message to the second entity includes:
   checking whether a user of the target terminal has requested an advertising service by analyzing the user's subscription information; and
   inserting route header fields into the first message if the user has requested the advertising service.

3. The method of claim 2, wherein the route header fields include each address of the first entity and the second entity.

4. The method of claim 3, wherein the first entity is a Call Session Control Unit (S-CSCF) and the second entity is an application server dedicated to advertising.

5. The method of claim 1, wherein the first message is a type of message based on Session Initiation Protocol (SIP).

6. The method of claim 1, wherein the source terminal and the target terminal have a subscription to the same or different SIP Core Home Network.

7. The method of claim 6, wherein if the source terminal and the target terminal have a subscription to a different SIP Core Home Network respectively, both the first entity and the second entity are configured in an originating Home Network or a terminating Home Network.

8. The method of claim 1, further comprising:
   receiving, by the first entity, from the target terminal a second message in response of the first message;
   sending, by the first entity, the second message to the second entity;
   receiving, by the first entity, from the second entity the second message including fourth advertising information inserted by the second entity; and
   sending, by the first entity, to the source terminal the second message having the fourth advertising information.

9. The method of claim 8, wherein the fourth advertising information is the same as or different with the first advertising information.

10. The method of claim 9, wherein the first, the second, the third or the fourth advertising information includes at least one of the following:
    one or more commercial advertisements;
    sports or current news;
    weather forecasting information;
    insecurity information;
    shopping information;
    localized and customized information; and
    link information to buy a product.

11. The method of claim 9, wherein the first advertising information is inserted into a header or a body of the first message, and
    the fourth advertising information is inserted into a header or a body of the second message.

12. The method of claim 11, wherein the first, the second, the third or the fourth advertising information is in a text format, an audio format, an image format or a video format.

13. A method for advertising in an IP Multimedia Subsystem (IMS), comprising:
    intercepting a message based on SIP (Session Initiation Protocol) in a path of the IMS signaling link, wherein the message is toward a target terminal and is originated by a source terminal, and the message has contents for a first session between the source terminal and the target terminal;
    inserting first advertising information into the intercepted message; and
    sending the message including the first advertising information to the target terminal,
    wherein, during the first session, a second session is established between a second entity and the source terminal by exchanging a third message transmitted from the second entity to the source terminal and a fourth message transmitted from the source terminal to the second entity in response to the third message, and a third session is established between the second entity and the target terminal by exchanging the third message transmitted from the second entity to the target terminal and the fourth message transmitted from the target terminal to the second entity in response to the third message, and wherein second advertising information is transmitted from the second entity to the source terminal via the second session, and third advertising information is transmitted from the second entity to the target terminal via the third session.

14. The method of claim 13, wherein the first advertising information is inserted into a header or body of the intercepted message.

15. The method of claim 13, wherein the intercepted message is a SIP MESSAGE, SIP INVITE or 200 OK.

16. The method of claim 13, wherein the first advertising information is inserted into the intercepted message by an application server dedicated to advertising or a CPM (Converged IP Message).

17. The method of claim 16, wherein the message including the first advertising information is sent, by the application server or the CPM, to the target terminal via a Call Session Control Unit (CSCF).

18. An application server for advertising in an IP Multimedia Subsystem (IMS), the server comprising:
a receiver configured to receive a message based on SIP (Session Initiation Protocol) from a first entity in a path of the IMS signaling link, wherein the message is toward a target terminal and is originated by a source terminal, and the message has contents for a first session between the source terminal and the target terminal;
a controller configured to insert first advertising information in the intercepted message; and
a transmitter configured to send the message including the first advertising information to the target terminal via the first entity, wherein, during the first session, a second session is established between a second entity and the source terminal by exchanging a third message transmitted from the second entity to the source terminal and a fourth message transmitted from the source terminal to the second entity in response to the third message, and a third session is established between the second entity and the target terminal by exchanging the third message transmitted from the second entity to the target terminal and the fourth message transmitted from the target terminal to the second entity in response to the third message, and wherein second advertising information is transmitted from the second entity to the source terminal via the second session, and third advertising information is transmitted from the second entity to the target terminal via the third session.

19. The application server of claim 18, wherein the first entity is a Call Session Control Unit (CSCF).

20. The application server of claim 18, wherein the intercepted message is a SIP MESSAGE, SIP INVITE or 200 OK.

21. The application server of claim 18, wherein the first advertising information is inserted into a header or body of the intercepted message.

22. The application server of claim 18, wherein the first, the second, or the third advertising information includes at least one of the following:
one or more commercial advertisements;
sports or current news;
weather forecasting information;
insecurity information;
shopping information;
localized and customized information; and
link information to buy a product.

* * * * *